United States Patent [19]

Howser

[11] Patent Number: 5,775,668

[45] Date of Patent: Jul. 7, 1998

[54] CONNECTING YOKE APPARATUS

[76] Inventor: Michael E. Howser, 22548 Westview Ave., Golden, Colo. 80401

[21] Appl. No.: 714,557

[22] Filed: Sep. 16, 1996

[51] Int. Cl.[6] ............................................ F16L 29/00
[52] U.S. Cl. ..................... 251/148; 285/187; 285/381.1
[58] Field of Search ........................... 251/148; 285/187, 285/381.1

[56] References Cited

U.S. PATENT DOCUMENTS

| | | | |
|---|---|---|---|
| 4,036,468 | 7/1977 | Webb | 251/148 X |
| 4,170,556 | 10/1979 | Pall | 285/187 X |
| 4,907,749 | 3/1990 | Bennett et al. | 285/187 X |
| 5,312,084 | 5/1994 | Weh | 251/148 |

*Primary Examiner*—Kevin Lee
*Attorney, Agent, or Firm*—Niro, Scavone, Haller & Niro

[57] ABSTRACT

A connecting yoke apparatus is disclosed for attachment to a valve of a compressed gas cylinder. The apparatus includes a yoke member having a first and a second end, the yoke member defining an opening for the reception therein of the valve. A connection extends through the first end of the yoke member for selective connection with the valve. The connection selectively cooperates in fluid tight communication with the valve when the valve is disposed within the opening. A piston is slidably disposed within the yoke member for selectively urging the valve and the connection towards each other such that when the piston is in an operative disposition thereof, the fluid tight communication between the connection and the valve is generated and when the piston is in an inoperative disposition thereof, disengagement of the yoke member from the valve is permitted. A heat sensitive expansion compensation adjuster is disposed between the second end of the yoke member and the piston for adjusting the operative disposition of the piston. The arrangement is such that when the temperature of the apparatus increases, the expansion compensation adjuster progressively moves the piston for urging the valve and the connection towards each other for maintaining the fluid tight communication. A driver cooperates with the piston for driving the piston between the inoperative and operative dispositions thereof.

20 Claims, 2 Drawing Sheets

CONNECTING YOKE APPARATUS

BACKGROUND OF THE INVENTION

1. Field of the Invention

The present invention relates to a connecting yoke apparatus for attachment to a valve of a pressurized gas cylinder.

More specifically, the present invention relates to a connecting yoke apparatus for attachment to a valve of a pressurized gas cylinder in which the apparatus includes means for maintaining a fluid tight communication therebetween.

2. Information Disclosure Statement

Pressurized gas cylinders or bottles are extensively used for compressed gas operations and the like. Typically, the gas cylinder includes a neck portion and a generally square head which houses a gas flow valve.

A yoke is then positioned over the head of the gas cylinder so that when the yoke is locked onto the head, a locking mechanism on the yoke opens the valve for permitting the flow therethrough of the gas to the welding equipment.

Accordingly, it is essential that the valve and the yoke be accurately and positively secured relative to each other because the escape of gas from such a union would be extremely hazardous.

Consequently, fillings have typically retightened the yoke on the valve during a filling operation in order to maintain a fluid tight seal therebetween.

Clearly, the interruption of a welding operation to resecure the gas seal is undesirable and in itself poses yet another potential situation for loss gas.

The present invention completely overcomes the aforementioned problems of the prior art arrangements by the provision of an apparatus that assures a air tight seal between the valve and the yoke regardless of the ambient temperature.

Therefore, it is a primary objective of the present invention to provide an improved connecting yoke apparatus for attachment to a valve of a compressed gas cylinder so that leakage of gas therefrom is inhibited.

Other objects and advantages of the present invention will be readily apparent to those skilled in the art by a consideration of the following description taken in conjunction with the annexed drawings which show an exemplary embodiment of the present invention.

SUMMARY OF THE INVENTION

The present invention relates to a connecting yoke apparatus for attachment to a valve of a compressed gas cylinder. The apparatus includes a yoke member having a first and a second end, the yoke member defining an opening for the reception therein of the valve.

A connection means extends through the first end of the yoke member for selective connection with the valve. The connection means selectively cooperates in air tight communication with the valve when the valve is disposed within the opening.

A piston means is slidably disposed within the yoke member for selectively urging the valve and the connection means towards each other. The arrangement is such that when the piston means is in an operative disposition thereof, the air tight communication between the connection means and the valve is generated. Also, when the piston means is in an inoperative disposition thereof, disengagement of the yoke member from the valve is permitted.

A heat sensitive expansion compensation adjusting means is disposed between the second end of the yoke member and the piston means for adjusting the operative disposition of the piston means. The arrangement is such that when the temperature of the apparatus increases, the adjusting means progressively moves the piston means for urging the valve and the connection means towards each other for maintaining the air tight communication therebetween.

A driving means cooperates with the piston means for driving the piston means between the inoperative and operative dispositions thereof.

In a more specific embodiment of the present invention, the yoke member is fabricated from a rectangular metallic block.

Also, the yoke member has a first and a second side and the opening is disposed between the ends of the yoke member and extends between the first side and the second side of the yoke member.

Stop means partially extend across the opening for locating the valve within the opening.

The first end of the yoke member defines a threaded channel for the reception therein of the connection means.

The yoke member defines a bore for the slidable reception therein of the piston means. The bore extends between the opening and the second end of the yoke member. The yoke member also defines a counterbore for guiding the piston means. The counterbore extends from the second end of the yoke member to the bore.

Additionally, the yoke member defines a transverse drilling. A pivot pin extends through the drilling, the pin being disposed adjacent to the second end of the yoke member for pivotally supporting the driving means relative to the yoke member.

The connection means includes a coupling which threadably cooperates with the first end of the yoke member.

Also, the coupling which is rigidly secured within the yoke member defines an annular groove which is disposed within the opening. An O-ring is disposed within the annular groove for providing a fluid tight communication with the valve.

The piston means is a metallic piston having a cylindrical configuration and a first and second extremity.

A flange extends radially outward from the second extremity of the piston. Also, the piston is slidably disposed relative to the bore from the first extremity thereof to the flange.

Additionally, the flange is slidably disposed within the counterbore, the bore and the counterbore defining therebetween an annular step.

A compression spring is disposed within the counterbore with the spring encircling the piston. The spring has a first edge and a second edge, with the first edge of the spring abutting against the step and the second edge of the spring abutting against the flange. The arrangement is such that the spring biases the piston away from the first end of the yoke member towards the inoperative disposition of the piston means.

The piston defines an elongate cavity which extends from the second extremity of the piston towards the first extremity thereof. In a preferred embodiment of the present invention, the cavity is of cylindrical configuration.

The heat sensitive expansion compensation adjusting means includes a bolt shaped member disposed within the piston means.

3

The bolt shaped member has a shank portion having a first and a second end.

A head is rigidly secured to the second end of the shank portion, the head being disposed within the cavity. The arrangement is such that the first end of the shank portion slidably cooperates with an extension of the cavity, the extension being defined by the piston. Also, the extension is disposed between the cavity and the first extremity of the piston.

A plurality of Bellville spring washers are disposed within the cavity and encircle the shank portion. The arrangement is such that when the temperature and pressure of the apparatus including the yoke member increases, an expansion of the yoke member which would tend to alter the operative disposition to permit leakage is compensated for by a corresponding expansion of the washers so that the operative disposition is maintained.

The head defines an annular groove, the head further including an O-ring disposed within the annular groove such that the O-ring slidably cooperates with the cavity.

The driving means is a lever having a distal and a proximal end with the proximal end defining a hole.

A transverse pivot pin extends through the hole and the second end of the yoke member for pivotally securing the lever to the second end of the yoke member.

The proximal end of the lever further defines a cam face which cooperates with the adjusting means for urging the piston means towards the operative disposition.

Also, the lever defines a flat portion that cooperates with the yoke member for limiting pivotal movement of the lever such that when the flat portion contacts the yoke body, the piston means is fully urged to the operative disposition thereof with the adjusting means being locked by the cam face against movement away from the connection means.

Many modifications and variations of the present invention will be readily apparent to those skilled in the art by a consideration of the annexed drawings taken in conjunction with the following description of a preferred embodiment. However, such modifications and variations fall within the spirit and scope of the present invention as defined by the appended claims.

BRIEF DESCRIPTION OF THE DRAWINGS

Similar reference characters refer to similar parts throughout the various Figs. of the drawing.

DETAILED DESCRIPTION OF THE DRAWINGS

Figure 1:
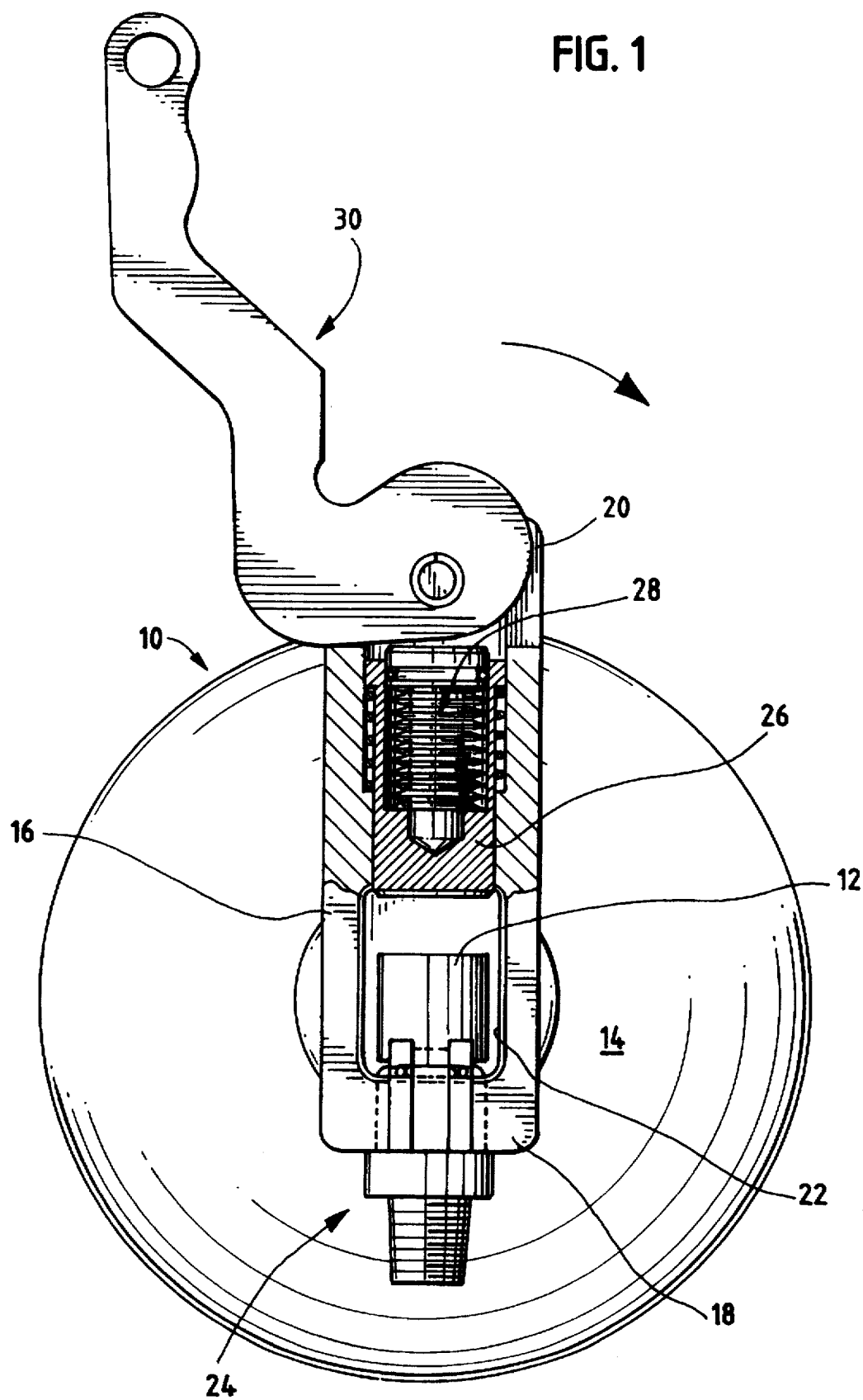
FIG. 1 is a top plan view of a connecting yoke apparatus for attachment to a valve of a pressurized gas cylinder according to the present invention, the apparatus being in the inoperative disposition thereof.
Figure 2:
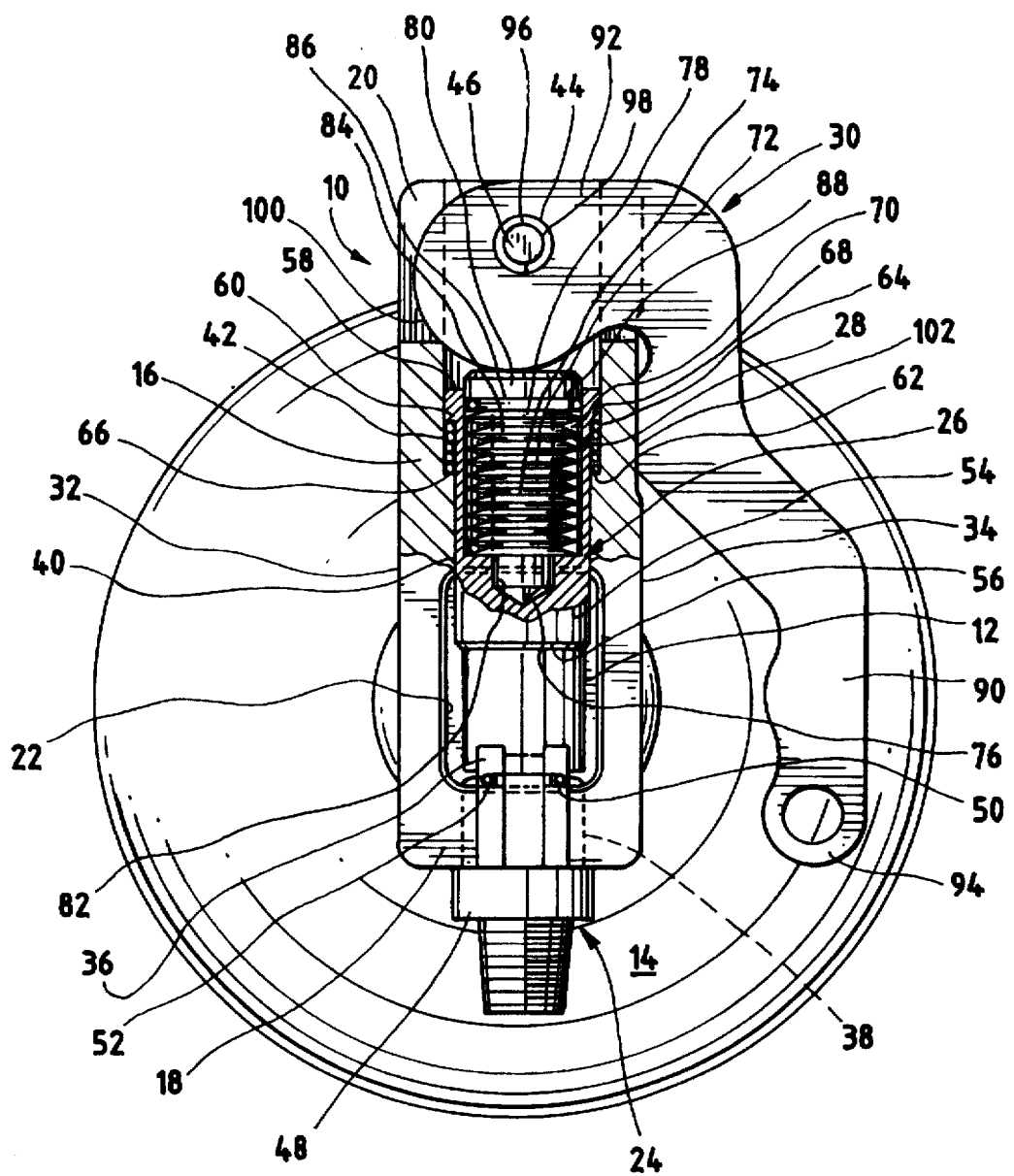
FIG. 2 is a similar view to that shown in FIG. 1 but shows the apparatus in the engaged operative disposition thereof.

FIGS. 1 and 2 show a connecting yoke apparatus generally designated 10 according to the present invention for attachment to a valve 12 of a pressurized gas cylinder 14. The apparatus 10 includes a yoke member 16 having a first and a second end 18 and 20 respectively. Additionally, the yoke member 16 defines an opening 22 for the reception therein of the valve 12.

A connection means generally designated 24 extends through the first end 18 of the yoke member 16 for selective connection with the valve 12. The connection means 24 selectively cooperates in fluid tight communication with the valve 12 when the valve 12 is disposed within the opening 22.

4

A piston means generally designated 26 is slidably disposed within the yoke member 16 for selectively urging the valve 12 and the connection means 24 towards each other. The arrangement is such that when the piston means 26 is in an operative disposition thereof as shown in FIG. 2, the fluid tight communication between the connection means 24 and the valve 12 is generated and maintained. Also, when the piston means 26 is in an inoperative disposition thereof as shown in FIG. 1, disengagement of the yoke member 16 from the valve 12 is permitted.

A heat sensitive expansion compensation adjusting means generally designated 28 is disposed between the second end 20 of the yoke member 16 and the piston means 26 for adjusting the operative disposition of the piston means 26. The arrangement is such that when the temperature of the apparatus 10 increases, the expansion compensation adjusting means 28 progressively moves the piston means 26 for urging the valve 12 and the connection means 24 towards each other for maintaining the fluid tight communication therebetween.

A driving means generally designated 30 cooperates with the piston means 26 for driving the piston means 26 between the inoperative and operative dispositions thereof.

The Yoke Member

In a more specific embodiment of the present invention, the yoke member 16 is fabricated from a rectangular metallic block.

The yoke member 16 has a first and a second side 32 and 34 respectively and the opening 22 is disposed between the ends 18 and 20 of the yoke member 16 and extends between the first side 32 and the second side 34 of the yoke member 16.

Stop means 36 partially extend across the opening 22 for locating the valve 12 within the opening 22.

The first end 18 of the yoke member 16 defines a threaded channel 38 for the reception therein of the connection means 24.

The yoke member 16 defines a bore 40 for the slidable reception therein of the piston means 26. The bore 40 extends between the opening 22 and the second end 20 of the yoke member 16. The yoke member 16 also defines a counterbore 42 for guiding the piston means 26. The counterbore 42 extends from the second end 20 of the yoke member 16 to the bore 40.

Additionally, the yoke member 16 defines a transverse drilling 44. A pivot pin 46 extends through the drilling 44, the pin 46 being disposed adjacent to the second end 20 of the yoke member 16 for pivotally supporting the driving means 30 relative to the yoke member 16.

The Connection Means

The connection means 24 includes a coupling 48 which threadably cooperates with the threaded channel 38 within the first end 18 of the yoke member 16.

Also, the coupling 48 defines an annular groove 50 disposed within the opening 22. An O-ring 52 is disposed within the annular groove 50 for cooperating in fluid tight communication with the valve 12. Additionally, the coupling 48 is rigidly secured within the yoke member 16.

The Piston Means

The piston means 26 is a metallic piston 54 having a cylindrical configuration and a first and second extremity 56 and 58 respectively.

A flange 60 extends radially outward from the second extremity 58 of the piston 54. The piston 54 is slidably disposed relative to the bore 40 from the first extremity 56 thereof to the flange 60.

Additionally, the flange 60 is slidably disposed within the counterbore 42. Also, the bore 40 and the counterbore 42 define therebetween an annular step 62.

A compression spring 64 is disposed within the counterbore 42 with the spring 64 encircling the piston 54. The spring 64 has a first edge 66 and a second edge 68. The first edge 66 of the spring 64 abuts against the step 62 and the second edge 68 of the spring 64 abuts against the flange 60. The arrangement is such that the spring 64 biases the piston 54 away from the first end 18 of the yoke member 16 towards the inoperative disposition of the piston means 26.

The piston 54 defines an elongate cavity 70 which extends from the second extremity 58 of the piston 54 towards the first extremity 56 thereof.

In a preferred embodiment of the present invention, the cavity 70 is of cylindrical configuration.

The Heat Sensitive Expansion Compensation Adjusting Means

The heat sensitive expansion compensation adjusting means 28 includes a bolt shaped member 72 disposed within the piston means 26.

The bolt shaped member 72 has a shank portion 74 having a first and a second end 76 and 78 respectively.

A head 80 is rigidly secured to the second end 78 of the shank portion 74. The head 80 is disposed within the cavity 70. The arrangement is such that the first end 76 of the shank portion 74 slidably cooperates with an extension 82 of the cavity 70, the extension 82 being defined by the piston 54. Also, the extension 82 is disposed between the cavity 70 and the first extremity 56 of the piston 54 for guiding the shank portion 74.

A plurality of Bellville spring washers 84 are disposed within the cavity 70 and encircle the shank portion 74. The arrangement is such that when the temperature of the apparatus 10 including the yoke member 16 increases, an expansion of the yoke member 16 which would tend to alter the operative disposition to permit leakage is compensated for by a corresponding expansion of the washers 84 so that the operative disposition is maintained.

The head 80 defines an annular groove 86. The head 80 further includes an O-ring 88 disposed within the annular groove 86 such that the O-ring 88 slidably cooperates with the cavity 70.

The Driving Means

The driving means 30 is a lever 90 having a proximal and a distal end 92 and 94 respectively with the proximal end 92 defining a hole 96.

A transverse pivot pin 98 extends through the hole 96 and the second end 20 of the yoke member 16 for pivotally securing the lever 90 to the second end 20 of the yoke member 16.

The proximal end 92 of the lever 90 further defines a cam face 100 which cooperates with the adjusting means 28 for urging the piston means 26 towards the operative disposition.

Also, the lever 90 defines a flat portion 102 that cooperates with the yoke member 16 for limiting pivotal movement of the lever 90. When the flat portion 102 contacts the second side 34 of the yoke body 16, the piston means 26 is fully urged to the operative disposition thereof, the adjusting means 28 being locked by the cam face 100 against movement away from the connection means 24.

In operation of the apparatus according to the present invention, when the yoke member 16 expands, there is a tendency for the seating pressure between the valve 12 and the O-ring 52 to be reduced. However, correspondingly, the washers 84 expand. Such expansion of the washers 84 between the locked head 80 and the piston 54 urges the piston 54 towards the first end 18 of the yoke member 16 for maintaining the valve 12 and O-ring 52 in a firmly sealed disposition thereof.

Many modifications and variations of the present invention will be readily apparent to those skilled in the art by a consideration of the annexed drawings taken in conjunction with the following description of a preferred embodiment. However, such modifications and variations fall within the spirit and scope of the present invention as defined by the appended claims.

What is claimed is:

1. A connecting yoke apparatus for attachment to a valve of a compressed gas cylinder, said apparatus comprising:

a yoke member having a first and a second end, said yoke member defining an opening for the reception therein of the valve;

connection means extending through said first end of said yoke member for selective connection with the valve, said connection means selectively cooperating in fluid tight communication with the valve when the valve is disposed within said opening;

piston means slidably disposed within said yoke member for selectively urging the valve and said connection means towards each other such that when said piston means is in an operative disposition thereof, said fluid tight communication between said connection means and the valve is generated and when said piston means is in an inoperative disposition thereof, disengagement of said yoke member from the valve is permitted;

heat sensitive expansion compensation adjusting means disposed between said second end of said yoke member and said piston means for adjusting said operative disposition of said piston means, the arrangement being such that when the temperature of the apparatus increases, said expansion compensation adjusting means progressively moves said piston means for urging the valve and said connection means towards each other for maintaining said fluid tight communication; and driving means cooperating with said piston means for driving said piston means between said inoperative and operative dispositions thereof.

2. A connecting yoke apparatus as set forth in claim 1 wherein, said yoke member is fabricated from a rectangular metallic block.

3. A connecting yoke apparatus as set forth in claim 1 wherein, said yoke member has a first and a second side, said opening being disposed between said ends of said yoke member and extending between said first side and said second side of said yoke member.

4. A connecting yoke apparatus as set forth in claim 1 further including:

stop means partially extending across said opening for locating the valve within said opening.

5. A connecting yoke apparatus as set forth in claim 1 wherein, said first end of said yoke member defines a threaded channel for the reception therein of said connection means.

6. A connecting yoke apparatus as set forth in claim 1 wherein, said yoke member defines a bore for the slidable reception therein of said piston means, said bore extending from said opening towards said second end of said yoke member.

7. A connecting yoke apparatus as set forth in claim 6 wherein, said yoke member defines a counterbore for guiding said piston means, said counterbore extending from said second end of said yoke member to said bore.

8. A connecting yoke apparatus as set forth in claim 1 wherein, said yoke member further defines a transverse drilling;

a pivot pin extending through said drilling, said pin being disposed adjacent to said second end of said yoke member for pivotally supporting said driving means relative to said yoke member.

9. A connecting yoke apparatus as set forth in claim 1 wherein, said connection means includes:

a coupling which threadably cooperates with said first end of said yoke member.

10. A connecting yoke apparatus as set forth in claim 9 wherein, said coupling defines an annular groove disposed within said opening;

an O-ring disposed within said annular groove for cooperating in said fluid tight communication with the valve.

11. A connecting yoke apparatus as set forth in claim 9 wherein, said coupling is rigidly secured within said yoke member.

12. A connecting yoke apparatus as set forth in claim 6 wherein, said piston means is a metallic piston;

said piston having a cylindrical configuration and a first and second extremity;

a flange extending radially outward from said second extremity of said piston, said piston being slidably disposed relative to said bore from said first extremity thereof to said flange.

13. A connecting yoke apparatus as set forth in claim 7 wherein, said piston means is a metallic piston;

said piston having a cylindrical configuration and a first and second extremity;

a flange extending radially outward from said second extremity of said piston, said piston being slidably disposed relative to said bore from said first extremity thereof to said flange;

said flange being slidably disposed within said counterbore, said bore and said counterbore defining therebetween an annular step;

a compression spring disposed within said counterbore, said spring encircling said piston, said spring having a first edge and a second edge, said first edge of said spring abutting against said step, said second edge of said spring abutting against said flange, the arrangement being such that said spring biases said piston away from said first end of said yoke member towards said inoperative disposition of said piston means.

14. A connecting yoke apparatus as set forth in claim 1 wherein, said piston means is a metallic piston having a first and a second extremity, said piston defining an elongate cavity, said cavity extending from said second extremity of said piston towards said first extremity thereof.

15. A connecting yoke apparatus as set forth in claim 14 wherein, said cavity is of cylindrical configuration.

16. A connecting yoke apparatus as set forth in claim 14 wherein, said heat sensitive expansion compensation adjusting means includes:

a bolt shaped member disposed within said piston means;

said bolt shaped member including:

a shank portion having a first and a second end;

a head rigidly secured to said second end of said shank portion, said head being disposed within said cavity, the arrangement being such that said first end of said shank portion slidably cooperates with an extension of said cavity, said extension being defined by said piston, said extension being disposed between said cavity and said first extremity of said piston;

a plurality of Bellville spring washers disposed within said cavity and encircling said shank portion, the arrangement being such that when the temperature of the apparatus including the yoke member increases, an expansion of the yoke member which would tend to alter said operative disposition to permit leakage is compensated for by a corresponding expansion of said washers so that said operative disposition is maintained.

17. A connecting yoke apparatus as set forth in claim 16 wherein, said head defines an annular groove;

said head further including:

an O-ring disposed within said annular groove such that said O-ring slidably cooperates with said cavity.

18. A connecting yoke apparatus as set forth in claim 1 wherein, said driving means includes:

a lever having a distal and a proximal end, said proximal end defining a hole;

a transverse pivot pin extending through said hole and said second end of said yoke member for pivotally securing said lever to said second end of said yoke member;

said proximal end of said lever further defining a cam face which cooperates with said adjusting means for urging said piston means towards said operative disposition.

19. A connecting yoke apparatus as set forth in claim 18 wherein, said lever defines a flat portion that cooperates with said yoke member for limiting pivotal movement of said lever such that when said flat portion contact said yoke body, said piston means is fully urged to said operative disposition thereof, said adjusting means being locked by said cam face against movement away from said connection means.

20. A connecting yoke apparatus for attachment to a valve of a pressurized gas cylinder, said apparatus comprising:

a yoke member having a first and a second end, said yoke member defining an opening for the reception therein of the valve;

connection means extending through said first end of said yoke member for selective connection with the valve, said connection means selectively cooperating in fluid tight communication with the valve when the valve is disposed within said opening;

piston means slidably disposed within said yoke member for selectively urging the valve and said connection means towards each other such that when said piston means is in an operative disposition thereof, said fluid tight communication between said connection means and the valve is generated and when said piston means is in an inoperative disposition thereof, disengagement of said yoke member from the valve is permitted;

heat sensitive expansion compensation adjusting means for adjusting said operative disposition of said piston means, the arrangement being such that when the temperature of the apparatus increases, said adjusting means progressively moves said piston means for urging the valve and said connection means towards each other for maintaining said fluid tight communication; and a lever pivotally secured to said yoke member and cooperating with said piston means for levering said piston means between said inoperative and operative dispositions thereof.

* * * * *